(12) United States Patent
Purushothaman et al.

(10) Patent No.: US 8,725,313 B2
(45) Date of Patent: May 13, 2014

(54) SYSTEM, A METHOD AND, AN APPARATUS FOR VEHICULAR COMMUNICATION

(71) Applicant: Tata Consultancy Services Limited, Maharashtra (IN)

(72) Inventors: Balamuralidhar Purushothaman, Karnataka (IN); Krishnan Srinivasarengan, Karnataka (IN)

(73) Assignee: Tata Consultancy Services Limited (IN)

( * ) Notice: Subject to any disclaimer, the term of this patent is extended or adjusted under 35 U.S.C. 154(b) by 7 days.

(21) Appl. No.: 13/727,952

(22) Filed: Dec. 27, 2012

(65) Prior Publication Data

US 2013/0204458 A1  Aug. 8, 2013

(30) Foreign Application Priority Data

Feb. 2, 2012 (IN) .......................... 314/MUM/2012

(51) Int. Cl.
*G06F 7/02* (2006.01)

(52) U.S. Cl.
USPC ............................................. 701/1

(58) Field of Classification Search
CPC ......... B60Q 5/00; G10K 15/04; G10K 15/02; G10K 2210/128; G10K 15/00; G10K 11/002; G10K 11/02; G10L 19/018
USPC ....................................... 701/1, 36
See application file for complete search history.

(56) References Cited

U.S. PATENT DOCUMENTS

| | | | |
|---|---|---|---|
| 6,489,885 B2 | 12/2002 | Solow | |
| 7,706,548 B2 | 4/2010 | Kanevsky et al. | |
| 8,160,276 B2 | 4/2012 | Liao et al. | |
| 2010/0030838 A1 | 2/2010 | Atsmon et al. | |
| 2011/0060480 A1 | 3/2011 | Mottla et al. | |
| 2011/0134971 A1 | 6/2011 | Choi et al. | |

FOREIGN PATENT DOCUMENTS

| | | | | | |
|---|---|---|---|---|---|
| CN | 2178195 | Y | * | 9/1994 | ............... B60Q 5/00 |
| CN | 103042971 | A | * | 4/2013 | ............... B60Q 5/00 |
| CN | 103137116 | A | * | 6/2013 | ............... G10K 9/12 |
| WO | 03085619 | A1 | | 10/2003 | |

OTHER PUBLICATIONS

University of British Columbia "The Portable Communication Device for Deaf," https://sites.google.com/2011eece474group4/ (published at least as early as Dec. 18, 2012).

(Continued)

*Primary Examiner* — Yonel Beaulieu
(74) *Attorney, Agent, or Firm* — Thompson Hine L.L.P.

(57) ABSTRACT

A system and method vehicle-to-mobile communication using a smart horn (515) comprising, a first processor (520) embedded in the vehicle, configured to generate and broadcast a plurality of sound waves having two spectrums, an audible spectrum and an inaudible spectrum, the sound waves comprising a plurality of information embedded (530) into the inaudible spectrum. A vehicle-embedded system (505) coupled to the said first processor (520) to capture a plurality of signals associated with the vehicle-embedded system. A second processor embedded in a receiving device (540) configured to capture and interpret the plurality of information embedded into the inaudible spectrum. The receiving device (540) comprising an application (545) that enables the receiving device (540) to interpret the plurality of information embedded in the inaudible sound spectrum captured by at least one microphone (535).

10 Claims, 2 Drawing Sheets

(56) References Cited

OTHER PUBLICATIONS

Noel McKeegan "Honda demonstrates V2V communication system for motorcyclists," http://www.gizmag.com/honda-demonstrates-v2v-communication-system-for-motorcyclists/10247/ (published at least as early as Dec. 18, 2012).

General Motors "GM's Latest Vehicle-to-Vehicle Communication Project Is Smartphone-Based," http://wot.motortrend.com/gm%E2%80%99s-latest-vehicle-to-vehicle-communication-project-is-smartphone-based-126905.html#axzz2FlwoQOvc (published at least as early as Dec. 18, 2012).

* cited by examiner

SYSTEM, A METHOD AND, AN APPARATUS FOR VEHICULAR COMMUNICATION

FIELD OF THE INVENTION

The present invention relates to communication, more particularly the present invention relates to a system, a method, and an apparatus for vehicle communication.

BACKGROUND OF THE INVENTION

An increasing number of vehicles are now equipped with vehicle-to-vehicle communication system, or mobile-to-vehicle communication systems. Such communication systems are mostly used for safety, traffic management, driver assistance systems, policing and enforcement, pricing and payments.

The vehicle-to-vehicle communication system generally utilizes a bandwidth in a range of 5.9 GHz in most countries, while other devices use Wi-Fi, Bluetooth, Near Field Communication (NFC), or some other kind of radio frequency for bi-directional communication.

In an application no. WO2003085619 by Naresh Kumar Goyle discloses a system that provides a noise free way of communicating signals to enable transfer of precise messages between vehicles that is vehicle-to-vehicle communication. The communication system enables a vehicle to convey specific message to nearby vehicle quickly and effectively. Naresh Kumar Goyle further discloses generation of signals that are transferred by transceivers to the other vehicles to actuate pre-recorded messages in the system of the other vehicle. Such system requires the information to be exchange, to be pre-recorded and available on either side of the communication system. Moreover, the information exchanged between vehicles in such communication is governed by a set of predefined codes, each code points to at least one pre-recorded message that need to be played. In addition to being a pre-structured, such communication employs a suitable wireless technology, which may require secure connection, device pairing, time consuming as well as lacks responsiveness to external actuation.

In an application, US20110134971 by Choi et al. discloses a system and a method for transferring and receiving data in an audio frequency band. The data to be transmitted are added to an audio signal and the audio signal is transmitted in the audio frequency band, so that the data for the acoustic communication are effectively transmitted to the recipient in the audio frequency band.

US 2005/0049732 by Kanevsky et al. and US 2010/0030838 by Atsmon et al. discuss communication between two intelligent elements using acoustic means. While Kanevsky et al. focus on using existing audio hardware like speakers and microphone for audio transmission, Atsmon et al. focus on using ultrasonic frequencies of range less than 50 kHz with special ultrasonic transducers.

The U.S. Pat. No. 6,489,885 issued to Solow, teaches an apparatus for storing horn sound in a digital format instead of using conventional horn mechanisms. The main components of the digital circuit disclosed by Solow are clock circuit, counter, a memory location and digital to analog convertor (DAC).

The application US20110060480 by Mottla et al. teaches a method, a system, and a mobile device that communicates directly with a vehicle-associated control module using either a TCP/IP communications channel or near-field communications. A user enters a request through an application provided in the mobile-device. The request can be a function, such as unlocking the vehicle doors, illuminating the interior or exterior lights, honking the horn, or activating a panic alarm. The disclosure teaches the use on a mobile device to control various function of a vehicle through a secure channel. The instruction flow is uni-directional from mobile to vehicle.

US 2008/0165622 by Liao et al. discuss the use of existing computer speaker and microphone for transmitting and receiving high frequency audio signals. The focus of this invention pertains to the ultrasonic/quasi-ultrasonic range of frequencies without any special interface requirement other than speakers and microphones.

Vehicle embedded systems today have multiple mechanisms to react in case of emergencies. A number of standards for example European Telecommunications Standards Institute standard TR 102 18 mandate different capabilities to be incorporated as part of safety measures. The possible implementation of this deals largely with the use of mobile networks or the WiFi network formed with near-by vehicles. However, there are situations where neither of mobile or WiFi network is available. In addition, there are multiple interfaces like Bluetooth, NFC for short-range communication supported by different systems, which result in an inability to form a communication network with a nearby device.

From the reference cited, there is a long felt need for a system, a method, and a device that utilizes existing setup without major modification for a vehicle communication that uses a readily available unused spectrum without affecting humans. Exploiting the unused spectrum needs is free, as no licensing for the spectrum is needed. The use in unused spectrum also reduces the signal interference. There is also a long felt need for a system that can setup a communication channel between two devices without the need of time consuming and network dependant operation like Bluetooth, Wi-Fi and other conventional mode of communication.

OBJECTS OF THE INVENTION

The principal object of the present invention is to provide a system utilizing upper audible frequency for vehicle communication.

Another object of the invention is to provide a system utilizing upper audible frequency to communicate without modifying the receiving apparatus or to the frequency generator.

Yet another object of the invention is to provide an apparatus that utilizes upper audible frequency for a vehicle communication with a mobile device in vicinity or any apparatus equipped to receive transmitted signals.

SUMMARY OF THE INVENTION

Before the present methods and apparatuses are described, it is to be understood that this invention is not limited to the particular apparatus and methodologies described, as there can be multiple possible embodiments of the present invention, which are not expressly illustrated, in the present disclosure. It is also to be understood that the terminology used in the description is for the purpose of describing the particular versions or embodiments only, and is not intended to limit the scope of the present invention, which will be limited only by the appended claims.

In one aspect of the invention, a system is disclosed that uses upper audio band frequency for vehicle communication using a vehicle horn as a mechanism to send a broadcast message. The vehicle horn generates the sound wave with information embedded using a processor to be broadcasted to the receiving device. The sound waves are captured by the receiving devices in the vicinity thus achieving data communication between a vehicle and the receiving device.

In another aspect of the invention, a method is provided that utilizes upper audio band frequency for vehicle communication to transmit pre-defined broadcast messages. According to an embodiment of the pre-defined broadcast messages or the plurality of information transmitted is attributed the condition under which the vehicle horn is pressed, and whether horn was raised manually or automatically.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and product disclosed in the drawings.

DESCRIPTION OF THE INVENTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present invention describes a system for data communication between a vehicle and an external receiving device. The invention provides a unique communication means incorporated using software. The system uses sound waves in the inaudible frequency range for data communication.

Figure 1:
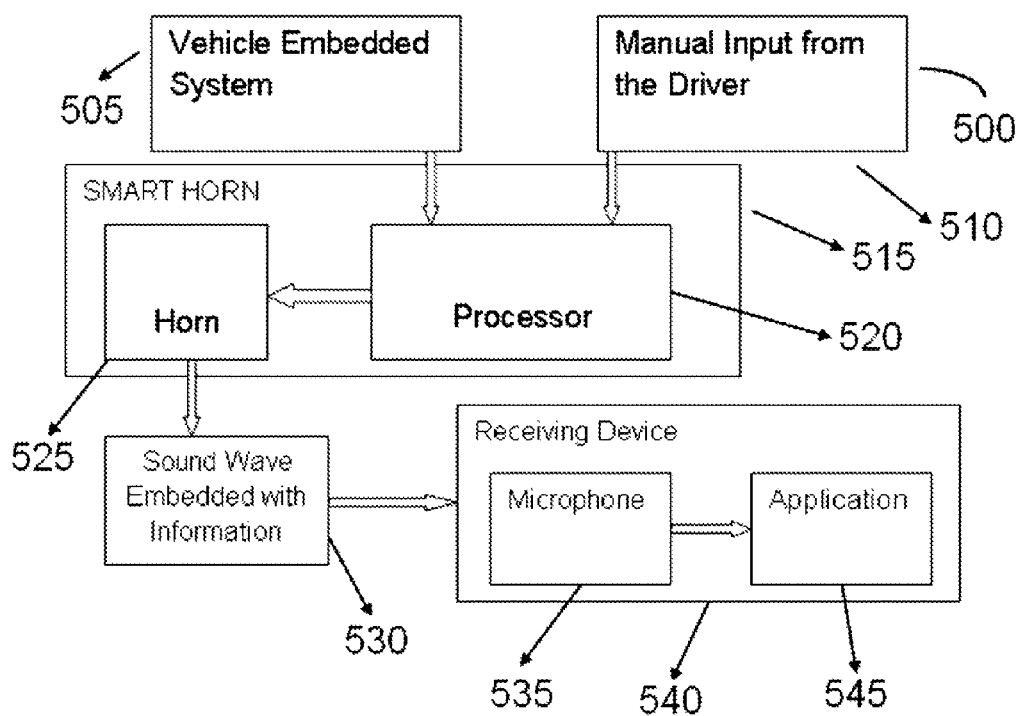
FIG. 1 illustrates a component diagram of the disclosed system.

Referring to FIG. 1, the diagram illustrates the various components involved in the implementation of the system. The system (500) consists of a smart horn (515) which includes a vehicle horn (525) and a first processor (520). The first processor (520) is adapted to activate the horn (525) automatically when receives a plurality of signals from a vehicle embedded system (505) or manually when raised by a driver (510). The first processor (520) is configured to receive the plurality of signals from a plurality of sensors connected to the vehicle-embedded system (505) and monitor various points in a vehicle. The first processor (520) modulates and embeds a plurality of information (530) in an inaudible upper frequency of a sound spectrum or sound wave generated by the horn (525). A receiving device (540) is configured to receive the sound wave embedded with the plurality of information (530) utilizing at least one microphone (535).

In an embodiment, the inaudible frequency range uses the human-imperceptible portion of audio band (16-20 kHz) with a sampling rate of 44.1 kHz is used for short-range data broadcast transmission between a vehicle and the receiving device (540). By using this audio range, the invention enables communication with the existing audio interfaces without requiring any custom-built interfaces. The use of upper audio band frequency for data communication reduces the excessive acoustic disturbance.

According to an embodiment of the present disclosure, the plurality of information transmitted is attributed the condition under which the smart horn (515) is pressed, and whether horn was raised manually or automatically. Furthermore, the speed of broadcast would be slow and hence will not allow detailed messages to be sent.

In an embodiment of the present disclosure, the following information is appropriately modulated during the broadcast: Vehicle identification number, Vehicle owner's identification, Vehicle health identification (obtained from vehicle-embedded systems (505) like OBD), Vehicle location details. This information is stored in the vehicle-embedded system (505) or in the internal memory of the smart horn so that smart horn can broadcast appropriately.

In an embodiment of the present disclosure, the range for broadcast transmission is not restricted to a specific distance for communication but is governed by the maximum power capability of the speakers of the horn. For example in an emergency scenario when the vehicle is either responding to an emergency or is involved in an emergency, maximum power of the speaker/horn is utilized so that the emergency message/broadcast can transmitted to a maximum range possible.

In an exemplary embodiment, the system is utilized for broadcasting emergency signal when a vehicle on road meets with an accident or when the driver goes through a difficult physical emergency. It is important to notify the vehicles around mainly, to request help, or pass the information to the concerned authorities, and to alert vehicles that are near-by or approaching about the emergency so that they are alert to avoid mishaps. In the case of an emergency scenario, the smart horn (515) is activated either automatically or manually. The automatic activation of horn is enabled, by the input received from the vehicle-embedded system (505), which in turn receives feedback from various sensors coupled to the vehicle system. For a manual case, the driver shall initiate the horn press.

In another embodiment of the present disclosure when an emergency vehicle like an ambulance is responding to an emergency, the wait at a traffic signal can prove fatal. Therefore, to clear the traffic, a simple press of the horn will send across the necessary distress message to the traffic controller, configured to receive the transmitted information, which will then expedite the traffic in the concerned lane. Moreover, transmitting the signal through upper audio band frequency would ensure that there is limited interference from the audible noise and the ambulance does not add to the sound pollution.

In yet another embodiment, of the present disclosure the communication signal broadcast information relating to vehicle identification for various purposes, like traffic patrolling, vehicle parking locations for the entry and exit of vehicle, and/or for toll booths. According to another embodiment of the present disclosure, the smart horn is configured to pay at a tollbooth or at parking place. In another embodiment, the pay system is utilized for bi-directional communication for paying.

In an embodiment, the receiving device (540) preferably consists of a microphone (535) and an application (545) to interpret the data transmitted via the smart horn (515). By using human-imperceptible portion of audio band (16 kHz-20 kHz), the system is able to communicate with the existing audio interfaces without requiring any special interfaces. The receiving device utilizes a second processor (Not shown) to capture and interpret the plurality of information embedded in the inaudible spectrum. In an embodiment, the receiving device can be an ordinary mobile phone configured to receive a broadcast message from the vehicle. The receiving device (540) de-multiplexes the plurality of information sent through the audio band and accordingly interprets it to the user with the help of the application (545).

In an embodiment, a vehicle horn (525) generates the sound wave with embedded information (530) to be broadcasted to the receiving device (540). These sound waves (530) are captured by the receiving devices in the vicinity thus achieving data communication between a vehicle and the receiving device (540).

Figure 2:
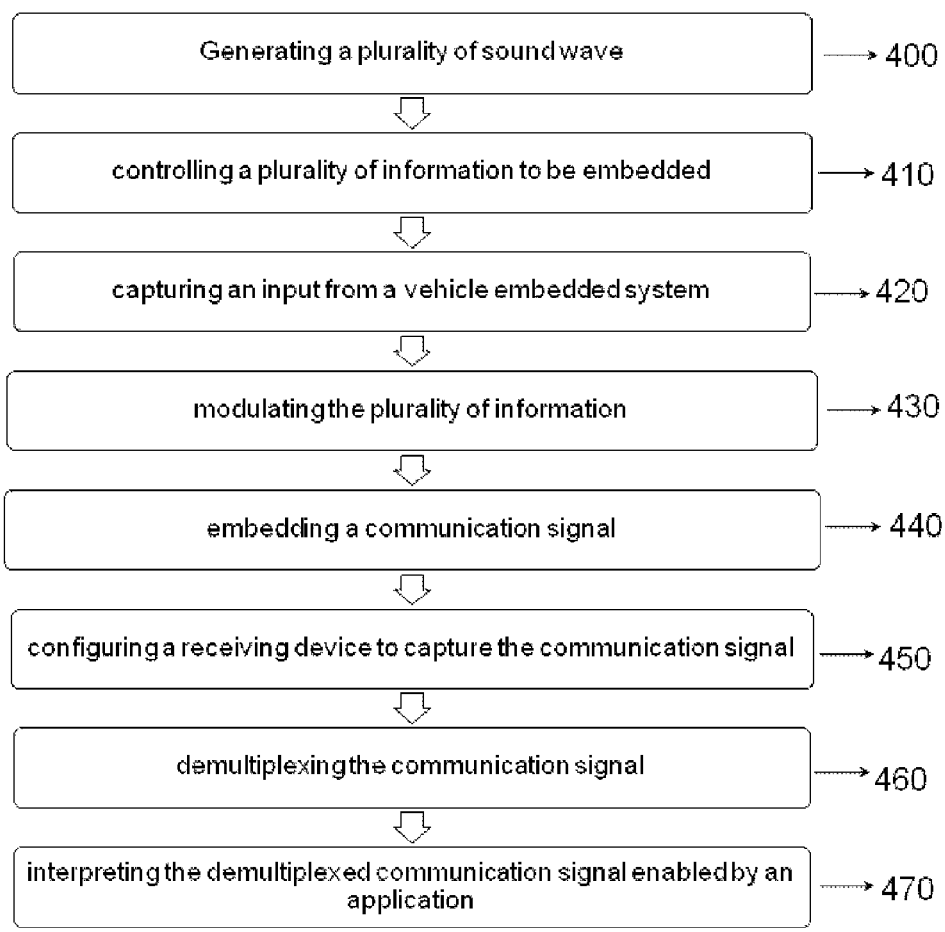
FIG. 2 illustrates a logical flow of the steps involved in implementing the object of the invention.

FIG. 2, illustrates a method for an embodiment of the present disclosure. In an embodiment, a method for uni-directional vehicle communication is disclosed, the method comprising steps of generating a plurality of sound wave (400) having two spectrum, an audible spectrum and an inaudible spectrum, by activating a horn of a vehicle. Controlling a plurality of information (410) to be embedded into the inaudible spectrum by capturing an input from a vehicle embedded system (420). Modulating the plurality of information (430). Embedding a communication signal (440), consisting the plurality of information, into to the inaudible spectrum, and transmitting by the horn. Configuring a receiving device (450) to capture the communication signal embedded in the inaudible spectrum. Demultiplexing the communication signal (460) by a second signal processor embedded in the receiving device. Interpreting the demultiplexed communication signal (470) by an application hosted on the receiving device.

While considerable emphasis has been placed herein on the particular features of this invention, it will be appreciated that various modifications can be made, and that many changes can be made in the preferred aspects without departing from the principles of the invention. These and other modifications in the nature of the invention or the preferred aspects will be apparent to those skilled in the art from the disclosure herein, whereby it is to be distinctly understood that the foregoing descriptive matter is to be interpreted merely as illustrative of the invention and not as a limitation.

WORKING EXAMPLE

In an exemplary embodiment of the invention, consider an emergency scenario when a vehicle utilizing a smart horn system (500) is involved in an accident and needs to send a distress message. A smart horn (515) receives a plurality of signals from a plurality of sensors connected to a vehicle-embedded system (505). In the present scenario, one such sensor can be an airbag deployment sensor or a braking sensor that detects the real-time condition of the vehicle. A first processor (520) on receiving the plurality of signals determines the severity of the plurality of signals. On determining the severity, the first processor (520) modulates and embeds a plurality of information (530) in an inaudible upper frequency of a sound spectrum or sound wave generated by the horn (525). The plurality of information (530) embedded in the inaudible frequency of the sound spectrum is received by a receiving device (540) having at least one microphone (535) and an application (545) configured to demultiplex, interpret and display the plurality of information to at least one user of the receiving device (540). The plurality of information in present scenario, being a distress signal is read by the user and accordingly responds to the situation.

In another exemplary embodiment, the present disclosure is installed in an emergency vehicle. When the emergency vehicle is responding to an emergency and is waiting for a traffic signal clearance. A simple press of a smart horn (515) will send across the necessary distress message to an intelligent traffic controller (or receiving device (540)) configured to demultiplex and interpret the distress messages transmitted. Transmitting the sound wave with plurality of information (530) embedded, through upper audio frequency ensures limited interference from the audible noise. The intelligent traffic controller on receiving and interpreting the plurality of information in the form of distress message will expedite the traffic in a lane attributed the emergency vehicle.

In yet another exemplary embodiment the present disclosure is applied for car-pooling and corporate transportation that organization and technology parks offer in developing nations. In present scheme/system for car-pooling, the car-pooling employees can register their vehicles at the transportation desk. The transportation group at the transportation desk allots code for each location in the city; the employee can load these codes in their mobile. When a cab configured for car-pooling reaches at a pre-determined position will transmit the information of its Vehicle ID, the destination code, the available vacancies, using the smart horn (515) in the upper audio band frequency for the receiving device (540) to capture. The receiving device (540) is further configured to send the information received to an employee or subscribed user. This enables to reduce the traffic congestion and allows for a quick pick up for the employees.

ADVANTAGES OF THE INVENTION

1. Uses easily and readily available wave spectrum for broadcasting of information that is inaudible to human ears.

2. The dependency on availability of radio signals like WiFi or mobile communication signals for transmission is not required thus enabling broader use of the invention.

3. The use on inaudible frequency for information transfer using a non-secured communication channel makes the transfer of emergency information easy.

4. The system can be adopted without making special modifications to the existing apparatus setup.

We claim:

1. A system for a vehicle communication using a smart horn (515), the system comprising:
   a first processor (520) embedded in a vehicle, configured to generate and broadcast a plurality of sound waves having at least two spectrums, an audible spectrum and an inaudible spectrum, the sound waves comprising a plurality of information embedded (530) into the inaudible spectrum;
   a vehicle embedded system (505) coupled to the first processor (520) to capture a plurality of signals associated with the vehicle embedded system; and
   a second processor embedded in a receiving device (540) configured to capture and interpret the plurality of information embedded into the inaudible spectrum.

2. The system for vehicle communication using the smart horn of claim 1, wherein the plurality of information comprises of a vehicle identification number, a vehicle owner identification, a vehicle health identification, and/or, a vehicle location details.

3. The system for vehicle communication using the smart horn of claim 1, wherein the inaudible spectrum has a frequency of 16,000 hertz to 20,000 hertz.

4. The system for vehicle communication using the smart horn of claim 1, wherein the plurality of sound wave has a sampling rate of 44.1 kHz.

5. The system for vehicle communication using the smart horn of claim 1, wherein the receiving device (540) is any device comprising at least one microphone (535) enabled to capture the plurality of information embedded in the inaudible sound spectrum.

6. The system for vehicle communication using the smart horn of claim 1, wherein an application (545) enables the second processor to interpret the plurality of information captured.

7. The system for vehicle communication using the smart horn of claim 1, communication device is selected from a group consisting of a mobile, a tollbooth, a parking booth, or a traffic signal.

8. A method for vehicle communication comprising:
generating a plurality of sound wave by activating a horn of a vehicle controlled by a first processor, wherein the plurality of sound wave have two spectrums, an audible spectrum and an inaudible spectrum;
selecting one or more information to be embedded into the inaudible spectrum in response to an input from a vehicle embedded system;
modulating the selected information using the first processor;
embedding a communication signal, comprising the plurality of information, into to the inaudible spectrum and transmitting by activation of the horn; and
configuring a microphone of a receiving device to capture and demodulate the plurality of information using a second processor to interpret the communication signal embedded in the inaudible spectrum.

9. The method for vehicle communication of claim 8, wherein the vehicle embedded system comprises of plurality of sensors mounted at various location on the vehicle.

10. The method for vehicle communication of claim 8, wherein the plurality of information comprises of a vehicle identification number, a vehicle owner identification, a vehicle health identification, and/or, a vehicle location details.

* * * * *